United States Patent
Tsuchida et al.

(10) Patent No.: US 9,276,445 B2
(45) Date of Patent: Mar. 1, 2016

(54) ROTOR AND INTERIOR PERMANENT MAGNET MOTOR

(75) Inventors: Kazuchika Tsuchida, Tokyo (JP); Masahiro Nigo, Tokyo (JP); Koji Yabe, Tokyo (JP); Tomoaki Oikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/353,556

(22) PCT Filed: Oct. 26, 2011

(86) PCT No.: PCT/JP2011/074702
§ 371 (c)(1),
(2), (4) Date: Apr. 23, 2014

(87) PCT Pub. No.: WO2013/061427
PCT Pub. Date: May 2, 2013

(65) Prior Publication Data
US 2014/0265705 A1  Sep. 18, 2014

(51) Int. Cl.
*H02K 1/27* (2006.01)

(52) U.S. Cl.
CPC .............. *H02K 1/276* (2013.01); *H02K 1/2766* (2013.01)

(58) Field of Classification Search
CPC .............................. H02K 1/276; H02K 1/2766
USPC .............. 310/156.38, 156.53, 156.56, 156.58
See application file for complete search history.

(56) References Cited

U.S. PATENT DOCUMENTS

| 6,940,205 | B1 | 9/2005 | Murakami et al. |
| 2002/0047432 | A1 | 4/2002 | Miyashita et al. |
| 2005/0225194 | A1 | 10/2005 | Murakami et al. |
| 2006/0119203 | A1* | 6/2006 | Brown et al. ............ 310/156.53 |
| 2007/0205687 | A1 | 9/2007 | Murakami et al. |
| 2007/0205688 | A1 | 9/2007 | Murakami et al. |

FOREIGN PATENT DOCUMENTS

| EP | 2 348 613 A1 | 7/2011 |
| JP | 05-304737 A | 11/1993 |
| JP | 09-131009 A | 5/1997 |
| JP | 10-136595 A | 5/1998 |
| JP | 11-146584 A | 5/1999 |
| JP | 11-187596 A | 7/1999 |
| JP | 2001-145283 A | 5/2001 |
| JP | 2002-345189 A | 11/2002 |

(Continued)

OTHER PUBLICATIONS

International Search Report of the International Searching Authority mailed Jan. 24, 2012 for the corresponding international application No. PCT/JP2011/074702 (with English translation).

(Continued)

*Primary Examiner* — Terrance Kenerly
(74) *Attorney, Agent, or Firm* — Posz Law Group, PLC

(57) ABSTRACT

A rotor, constituting an interior permanent magnet motor, includes magnets that are inserted into the rotor, and a rotor core containing magnet insertion pockets to which the magnets are inserted, and, when the magnets are inserted, the magnet insertion pockets are formed to provide openings in areas except both ends of an inner circumferential face, at both ends in a circumferential direction of the magnets.

9 Claims, 14 Drawing Sheets

(56) References Cited

FOREIGN PATENT DOCUMENTS

| | | |
|---|---|---|
| JP | 2003-088071 A | 3/2003 |
| JP | 2007-014199 A | 1/2007 |
| JP | 2007-060755 A | 3/2007 |
| JP | 2009-254143 A | 10/2009 |
| JP | 2010-004673 A | 1/2010 |
| JP | 2010-016952 A | 1/2010 |
| JP | 2010-200507 A | 9/2010 |
| JP | 2010-206944 A | 9/2010 |
| WO | 2009/014172 A1 | 1/2009 |
| WO | 2010/058609 A1 | 5/2010 |

OTHER PUBLICATIONS

Office action dated Sep. 16, 2014 in the corresponding JP Application No. 2013-540550 (and partial English translation).

Search Report mailed Dec. 17, 2015 issued in corresponding EP patent application No. 11874702.1-1905.

* cited by examiner

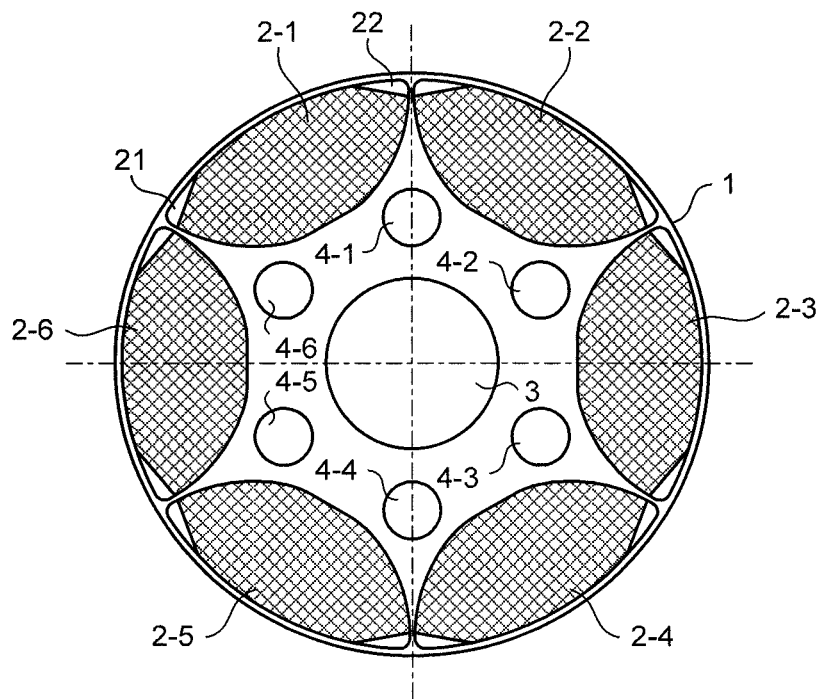
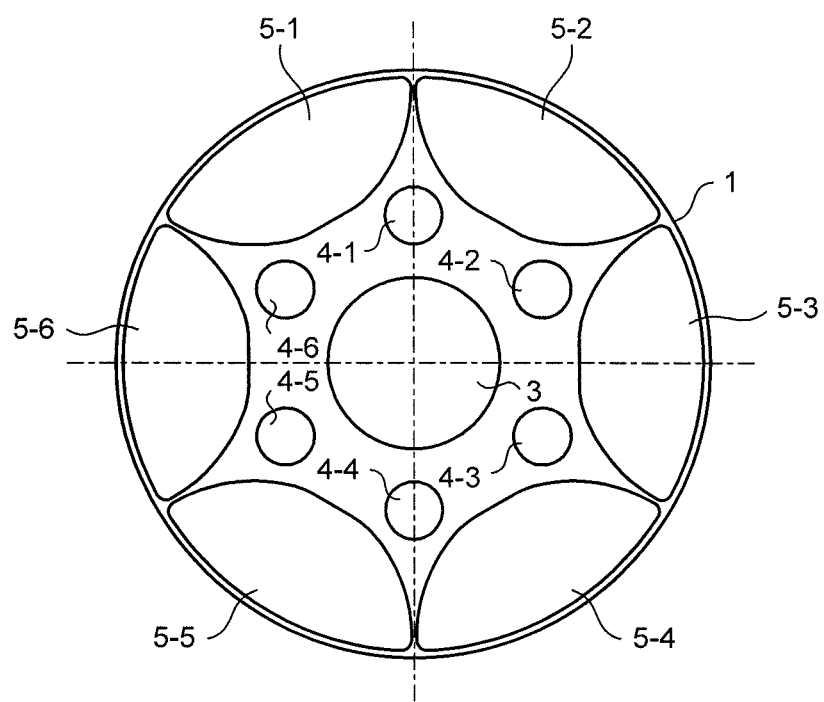

ROTOR AND INTERIOR PERMANENT MAGNET MOTOR

CROSS REFERENCE TO RELATED APPLICATION

This application is a U.S. national stage application of International Patent Application No PCT/JP2011/074702 filed on Oct. 26, 2011.

TECHNICAL FIELD

The present invention relates to a rotor and an interior permanent magnet motor.

BACKGROUND

With an interior magnet motor (interior permanent magnet (IPM) motor) in which permanent magnets are embedded in a rotor, a structure where openings are provided at the ends of the permanent magnets to suppress demagnetization is known (see, for example, Patent Literature 1 mentioned below).

PATENT LITERATURE

Patent Literature 1: Japanese Patent Application Laid-open No. 2007-14199

Technical Problem

The manner in which demagnetization occurs depends on the shape of the motor and the thickness of the magnets. Demagnetization of the magnets begins at the outer circumferential side among the ends; demagnetization does not begin at all of the ends. However, the problem with the above-described conventional technique of providing openings at the ends is that, because openings are provided at the ends regardless of the context of demagnetization, the magnetic force declines, which leads to a reduction in efficiency.

SUMMARY

The present invention is made in view of the above, and its object is to obtain a rotor and an interior permanent magnet motor which can prevent a decline in magnetic force.

The present invention is directed to a rotor constituting an interior permanent magnet motor that achieves the object. The rotor includes a permanent magnet generating a magnetic field; and a rotor core including a magnet insertion pocket to which the permanent magnet is inserted. When the permanent magnet is inserted, the magnet insertion pocket is formed so as to provide a space in an area except both ends of an inner circumferential face, at both ends in a circumferential direction of the permanent magnet.

The rotor and the interior permanent magnet motor according to the present invention offer the advantageous effect of preventing a decline in magnetic force caused by demagnetization.

BRIEF DESCRIPTION OF DRAWINGS

FIG. 1 is a cross-sectional view of a rotor of an embodiment.

FIG. 2 is a cross-sectional view depicting an example of the shape of a rotor core.

DETAILED DESCRIPTION

An embodiment of a rotor and an interior permanent magnet motor according to the present invention is described below in detail with reference to the accompanying drawings. The present invention is not limited to this embodiment.

Embodiment

FIG. 1 is a cross-sectional view of a rotor of an embodiment according to the present invention. FIG. 1 depicts a state in which magnets 2-1 to 2-6 are inserted into a rotor core 1. FIG. 2 is a cross-sectional view depicting an example of the shape of the rotor core 1 of the present embodiment. The rotor of the present embodiment is placed in the interior of a stator which is not depicted, and constitutes, along with the stator, the interior permanent magnet motor (hereinafter "motor").

The rotor core 1 is formed by die-cutting a thin electromagnetic steel sheet (a sheet thickness of, for example, approximately 0.1 to 1.0 mm) to a predetermined shape, and laminating a predetermined number (plural sheets). As depicted in FIGS. 1 and 2, a shaft hole 3 that allows a shaft (a rotating shaft) to pass through is formed in the approximate center of the rotor core 1, and magnet insertion pockets 5-1 to 5-6 for inserting the magnets 2-1 to 2-6 are formed at approximately equal intervals in the rotor core 1 in the circumferential direction. In addition, holes 4-1 to 4-6 which are, for example, rivet holes or vents, are formed on the exterior side of the shaft hole 3 of the rotor core 1.

The magnets (permanent magnets) 2-1 to 2-6 are, for example, ferrite magnets, and both sides thereof are each magnetized to the N pole and the S pole. The magnets 2-1 to 2-6 are deposited into the magnet insertion pockets 5-1 to 5-6, respectively, so that N-pole faces and S-pole faces alternate. Although FIGS. 1 and 2 depict an example in which the number of magnetic poles of the rotor is six, the number of magnetic poles of the rotor can be any number so long as the number is two or more. Also, the shape and the number of the holes 4-1 to 4-6 are not limited to the example of FIGS. 1 and 2.

Figure 3:
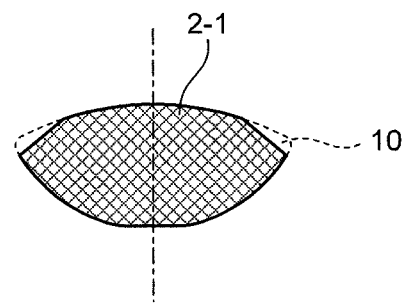
FIG. 3 is a cross-sectional view depicting an example of the shape of a magnet.

FIG. 3 is a cross-sectional view depicting an example of the shape of the magnet 2-1. The magnet 2-1 is provided with cut-off portions 10 on the end sides on both sides of an outer circumferential side (a face that is the outer circumferential side of the rotor when inserted into the rotor core 1). On the other hand, the magnet insertion pockets 5-1 to 5-6 are formed so that magnets without cut-offs (the shape defined by dotted lines in FIG. 3) can be embedded. This allows openings (space) 21 and 22 to be formed at ends on the outer circumferential side as depicted in FIG. 1 when the magnet 2-1 is inserted into the magnet insertion pocket 5-1. The shape of the magnets 2-2 to 2-6 is also the same as that of the magnet 2-1, and openings are likewise formed at the ends on the outer circumferential side by inserting the magnets 2-2 to 2-6 into the magnet insertion pockets 5-2 to 5-6.

Figure 4:
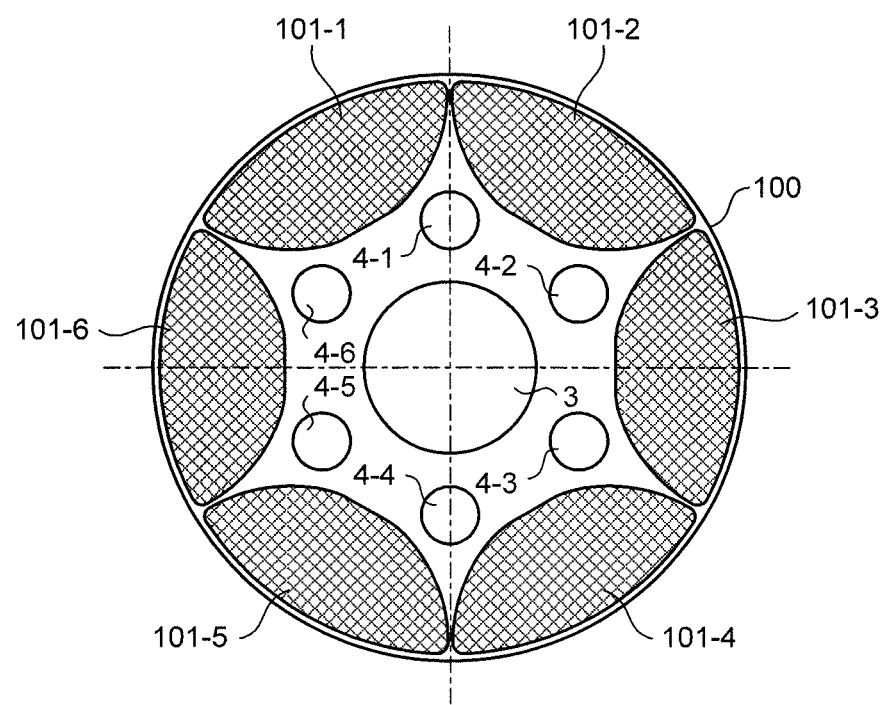
FIG. 4 depicts an example of a conventional rotor in which openings are not provided.

FIG. 4 depicts an example of a conventional rotor in which openings are not provided. A shaft hole 3, holes 4-1 to 4-6, and magnet insertion pockets 5-1 to 5-6 having the same shape as the rotor core 1 in FIG. 2 are formed in a rotor core 100 of the rotor depicted in FIG. 4. In addition, magnets 101-1 to 101-6 are a shape derived by providing no cut-offs to the magnets 2-1 to 2-6 (a shape derived by elongating the magnet portion to the dotted line portions of FIG. 3). In the example of FIG. 4, openings are not formed when the magnets 101-1 to 101-6 are inserted into the magnet insertion pockets 5-1 to 5-6.

Figure 5:
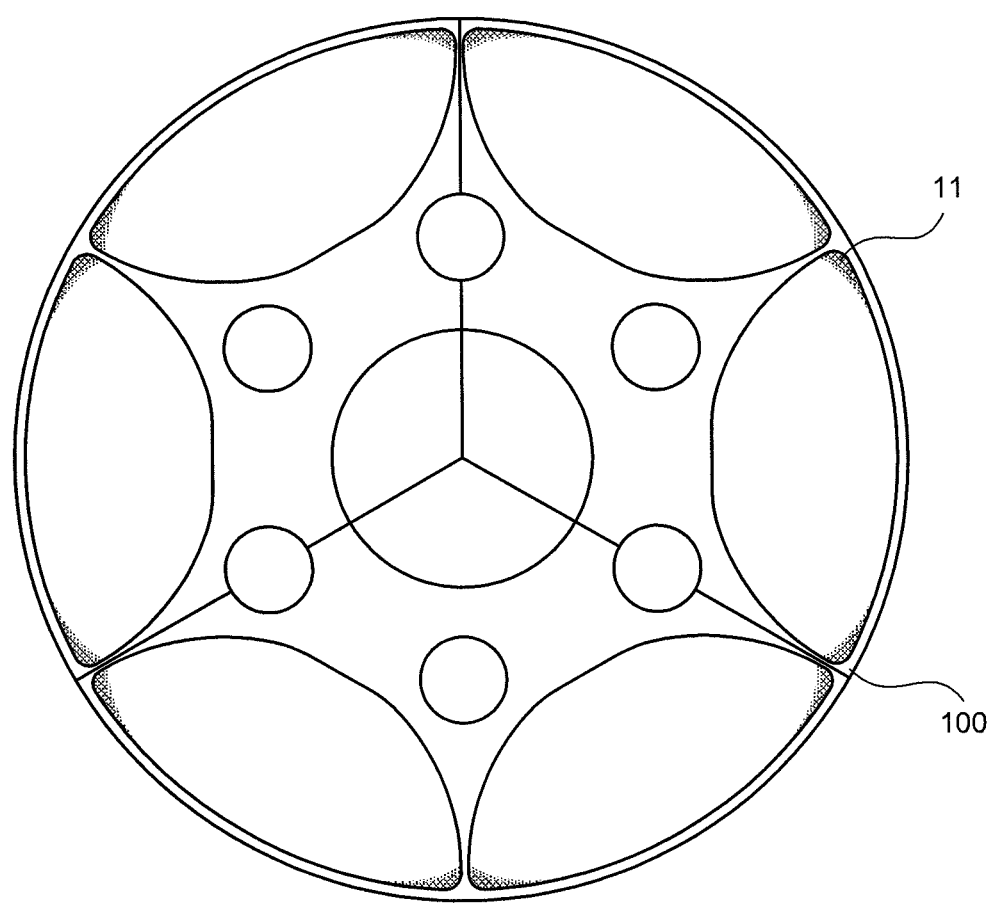
FIG. 5 depicts an example of demagnetization under the influence of a demagnetizing field in the rotor depicted in FIG. 4.
Figure 6:
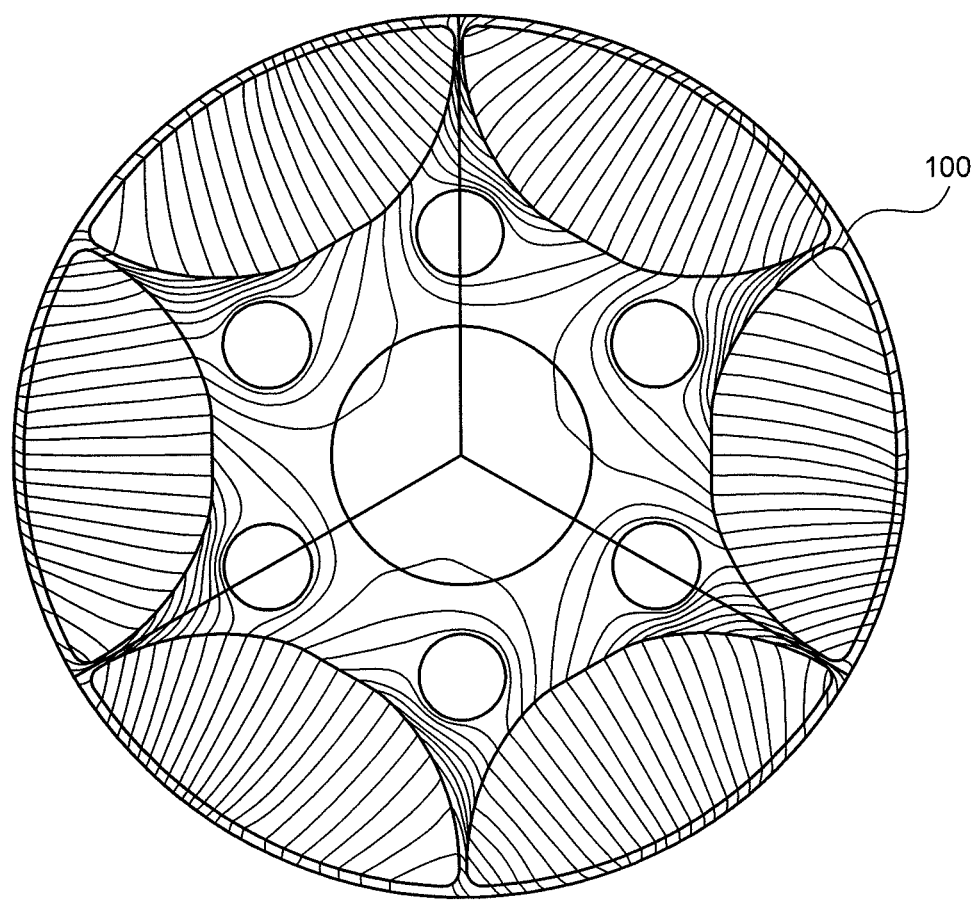
FIG. 6 depicts an example of a flux line diagram when the rotor in FIG. 4 is subjected to the demagnetizing field.

FIG. 5 depicts an example of demagnetization under the influence of a demagnetizing field in the rotor depicted in FIG. 4. This depicts the state of demagnetization when a uniform demagnetizing field is applied to the entire surface of the outer circumference of the rotor, and FIG. 5 is a contour diagram depicting a simulation result obtained by assuming that, a three percent demagnetization occurs in the rotor depicted in FIG. 4, due to the influence of the demagnetizing field, in which darker the color, the greater the amount of reduction in magnetic flux. Demagnetizing fields are magnetic fields that occur in a direction opposite to the original magnetic fields, and areas that have a greater demagnetizing field have greater demagnetization. FIG. 6 depicts an example of a flux line diagram when the rotor in FIG. 4 is subjected to the demagnetizing field. FIG. 6 is a flux line diagram when the same demagnetizing field as in the example of FIG. 5 has occurred.

FIG. 5 demonstrates that demagnetization is occurring mainly at areas of darker colors exemplified by demagnetized portions 11, that is, at the ends on the outer circumferential side of the magnets 101-1 to 101-6 (interpolar portions). By its nature, demagnetizing fields tend to avoid areas that have low magnetic permeability and passes through areas that have high permeability. Since the magnets 101-1 to 101-6 have low magnetic permeability that is approximately equal to the air, when subject to the demagnetizing field from the stator side, the magnetic flux avoids the magnets 101-1 to 101-6 and tries to pass through the core parts between the adjacent magnets 101-1 to 101-6. FIG. 6 demonstrates that the magnetic flux is trying to pass through mainly the core parts between the magnets. These core parts, however, have narrow width. Thus, when the magnetic flux becomes unable to pass through due to magnetic saturation, the magnetic flux passes through the ends of the magnets, which induces demagnetization of the ends on the outer circumferential side of the magnets 101-1 to 101-6 of FIG. 5.

Demagnetization is a phenomenon that should be avoided in motors. The magnetic force of demagnetized magnets cannot be restored, giving rise to problems such as a reduction in efficiency, and in the case of sensorless drive, failure to start the motor, due to inconsistencies in the control constant that is used when starting the motor.

Figure 7:
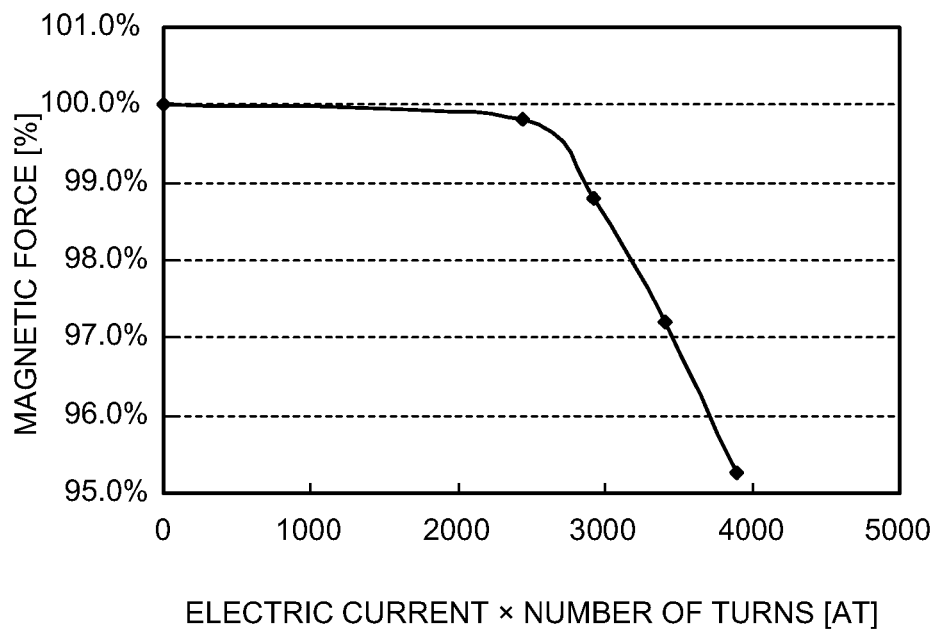
FIG. 7 represents an example of a relationship between the strength of a demagnetizing field and the magnetic force of the rotor in FIG. 4.

FIG. 7 represents an example of a relationship between the strength of a demagnetizing field (the electric current X the stator winding) and the magnetic force of the rotor in FIG. 4. As depicted in FIG. 7, as the demagnetizing field force increases, the magnetic force of the rotor in FIG. 4 decreases. Generally, assuming that the magnetic force in a state without demagnetization is 100%, when the magnetic force declines to 97% (a three percent demagnetization), the control constant changes, making sensorless drive of the motor difficult.

Figure 8:
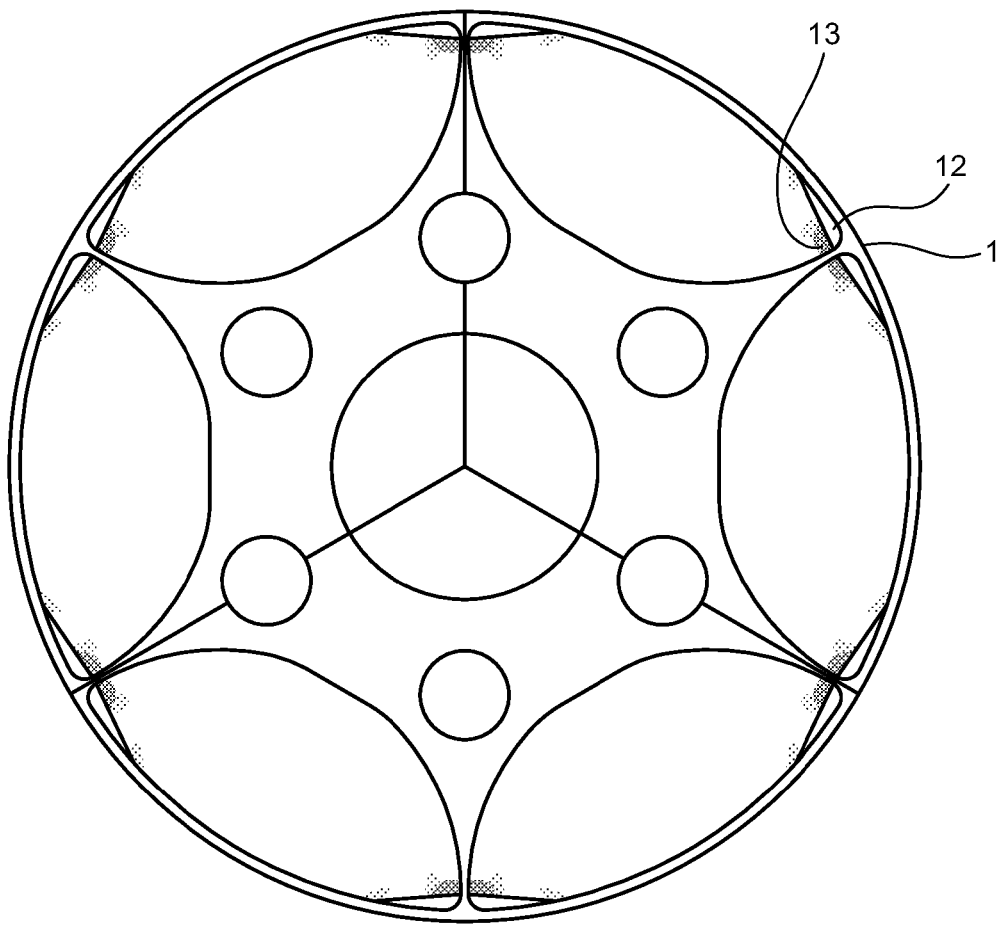
FIG. 8 depicts an example of demagnetization under the influence of a demagnetizing field in the rotor depicted in FIG. 1.

In the present embodiment, as depicted in FIG. 1, magnets where demagnetization has occurred are removed, leaving openings. FIG. 8 depicts an example of demagnetization under the influence of a demagnetizing field in the rotor depicted in FIG. 1. In the example of FIG. 8, a demagnetizing field having the same strength as in the example of FIG. 4 is applied. FIG. 8 is a contour diagram depicting a simulation result obtained when the rotor depicted in FIG. 1 is subjected to a demagnetizing field having the same strength as in the example of FIG. 5, in which darker the color, the greater the amount of reduction in magnetic flux.

Comparison of FIG. 8 and FIG. 5 reveals that, the rotor in FIG. 1 has a smaller area of demagnetized portions (for example, demagnetized portions 13) when subjected to a demagnetizing field than the rotor in FIG. 4. Since the magnetic permeability of the magnets is approximately equal to the air, the effect of the flow of magnetic flux of the demagnetizing field will not change even when the ends of the magnets are cut off. That is, even when parts of the magnet portions where demagnetization has occurred in FIG. 5 are removed, leaving openings (cut-off portions 12 in FIG. 8), the portions that are subjected to demagnetization will remain the same. While the portions that are subjected to demagnetization remain the same, since the magnetic regions of such portions have diminished, the area to be demagnetized becomes smaller, providing resistance to demagnetization.

Figure 9:
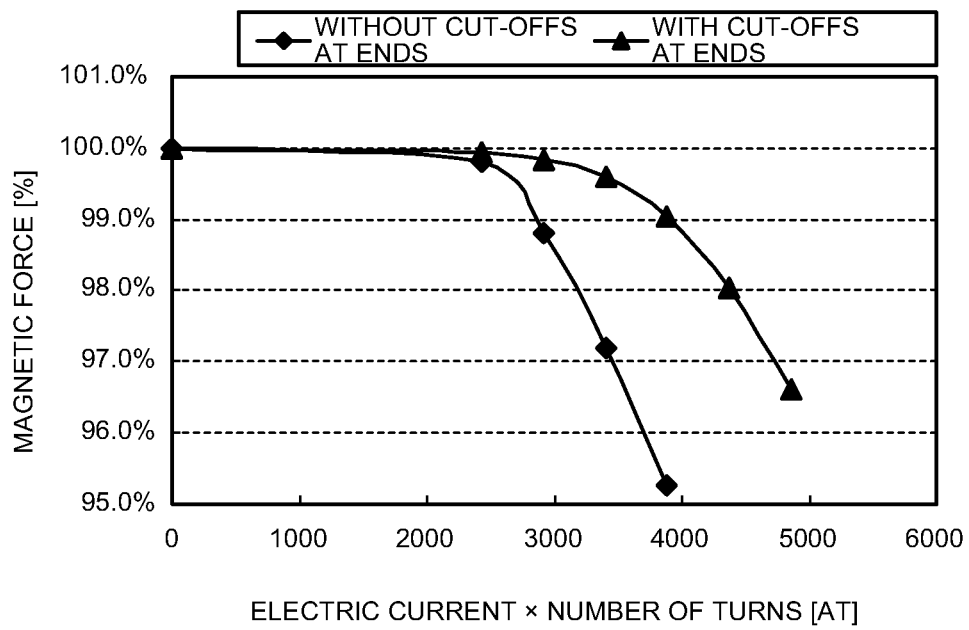
FIG. 9 is a graph that shows the relationship between the magnetic force to the strength of the demagnetizing field when the ends of the outer circumferential sides of the magnets do include and do not include cut-offs.

FIG. 9 is a graph that shows the relationship between the magnetic force to the strength of the demagnetizing field when the ends of the outer circumferential sides of the magnets do include and do not include cut-offs. The curved line indicated with rectangular symbols, which represents a case where there is no cut-off on the ends on the outer circumferential side of the magnets, is the same as the curved line in FIG. 7. The curved line indicated with triangular symbols, which represents a case where there are cut-offs on the ends on the outer circumferential side of the magnets, serves to represent the relationship of the magnetic force to the strength of a demagnetizing field in the rotor depicted in FIG. 1. As can be observed in FIG. 9, by removing magnet portions with a higher susceptibility to demagnetization, resistance to demagnetization is enhanced.

When a three percent demagnetization in which the controllability becomes difficult is taking place, demagnetization does not extend into the interior of the magnets; demagnetization does not take place at all ends of the magnets. In such a case, when the ends of the inner circumferential faces of the magnets in which demagnetization is not occurring are cut off, the magnetic force declines, leading to a reduction in efficiency. Thus, in the present embodiment, by cutting off portions among the ends in the circumferential direction of the magnets (that is, the ends on the outer circumferential side) except for the ends of the inner circumferential faces, a decline in magnetic force is prevented while resistance to demagnetization is provided.

The shape of the cut-offs (the openings) at the ends on the outer circumferential side of the magnets and the shape of the magnets are not limited to the example of FIG. 1 FIG. 10 to FIG. 23 depict examples of the shape of the openings and the magnets. In the following drawings, while a shaft hole 3 and holes 4-1 to 4-6 are the same as in FIG. 1, the shape, for example, of the shaft hole 3 and the holes 4-1 to 4-6, is not limited to the depicted example.

Figure 10:
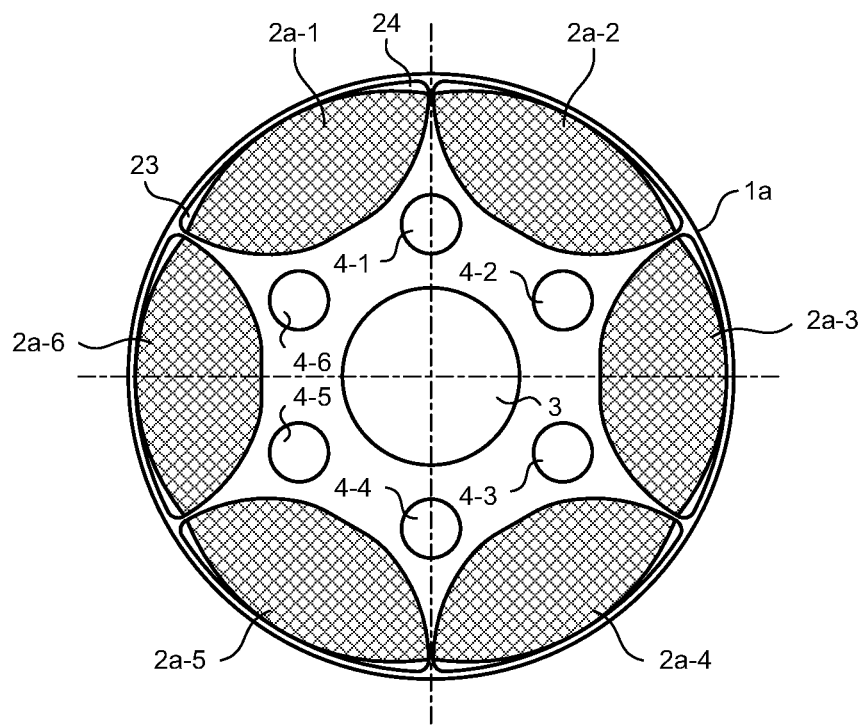
FIG. 10 depicts an example of a rotor in which the curvature of outer circumferential sides of magnet insertion pockets and magnets is made to differ.

An example of FIG. 10 is provided as a proposed shape that differs from FIG. 1. This depicts an example of a rotor in which the curvature of the outer circumferential sides of the magnet insertion pockets and the magnets are made to differ. In the example of FIG. 10, magnet insertion pockets to which magnets 2a-1 to 2a-6 are inserted into a rotor core 1a are formed, and the outer circumferential faces of both the magnet insertion pockets and the magnets 2a-1 to 2a-6 are shaped as arcs, and openings (for example, openings 23 and 24) are provided at the ends of the magnets by forming the radius of the curvature of the outer circumferential faces of the magnets to be smaller than the radius of the curvature of the outer circumferential side of the magnet insertion pockets. However, such a shape causes minute openings to be provided at magnetic pole center sides of the outer circumferential faces of the magnets where demagnetization in the range of three percent does not occur. Since the outer circumferential faces of the magnets greatly affect the magnetic force, providing unnecessary openings at the outer circumferential faces of the magnets would be undesirable in terms of efficiency.

Figure 11:
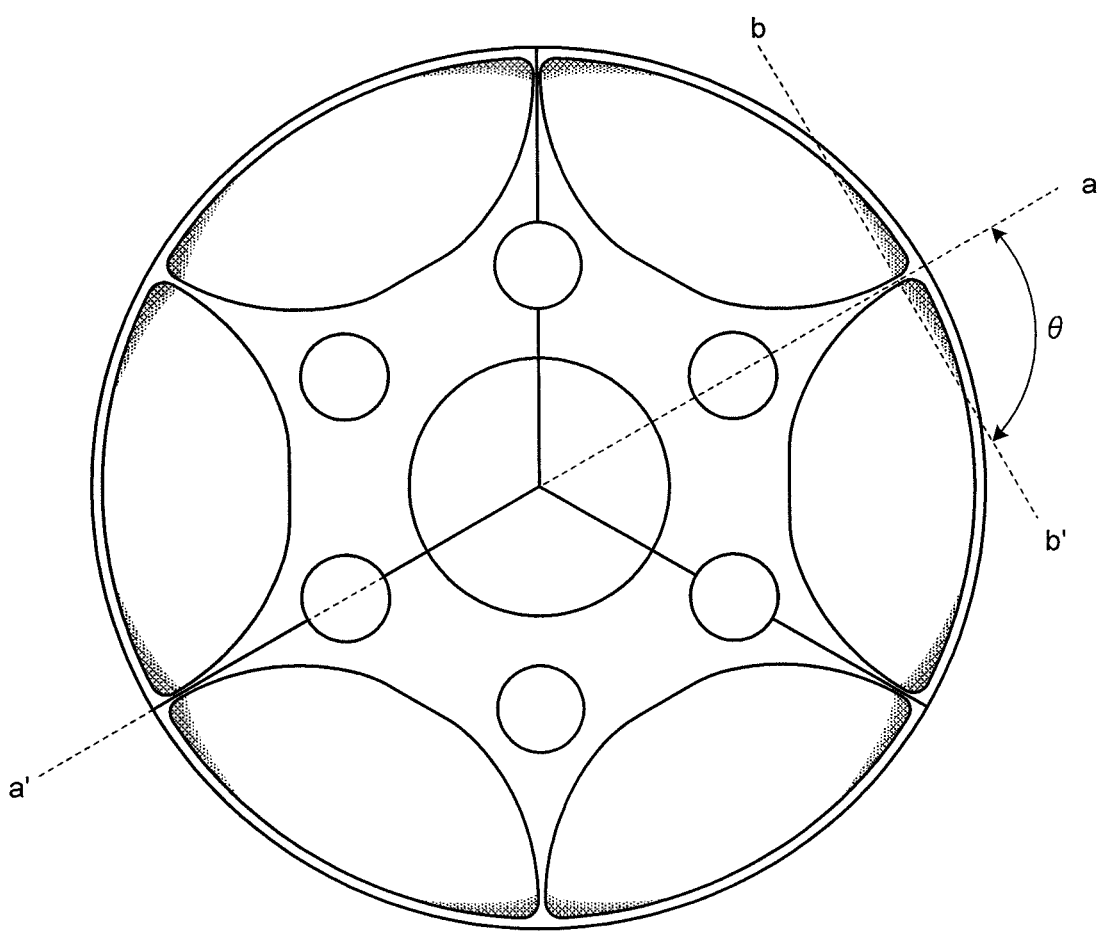
FIG. 11 depicts a rotor that has been demagnetized by three percent, and depicts how an angle $\theta$ is defined.
Figure 12:
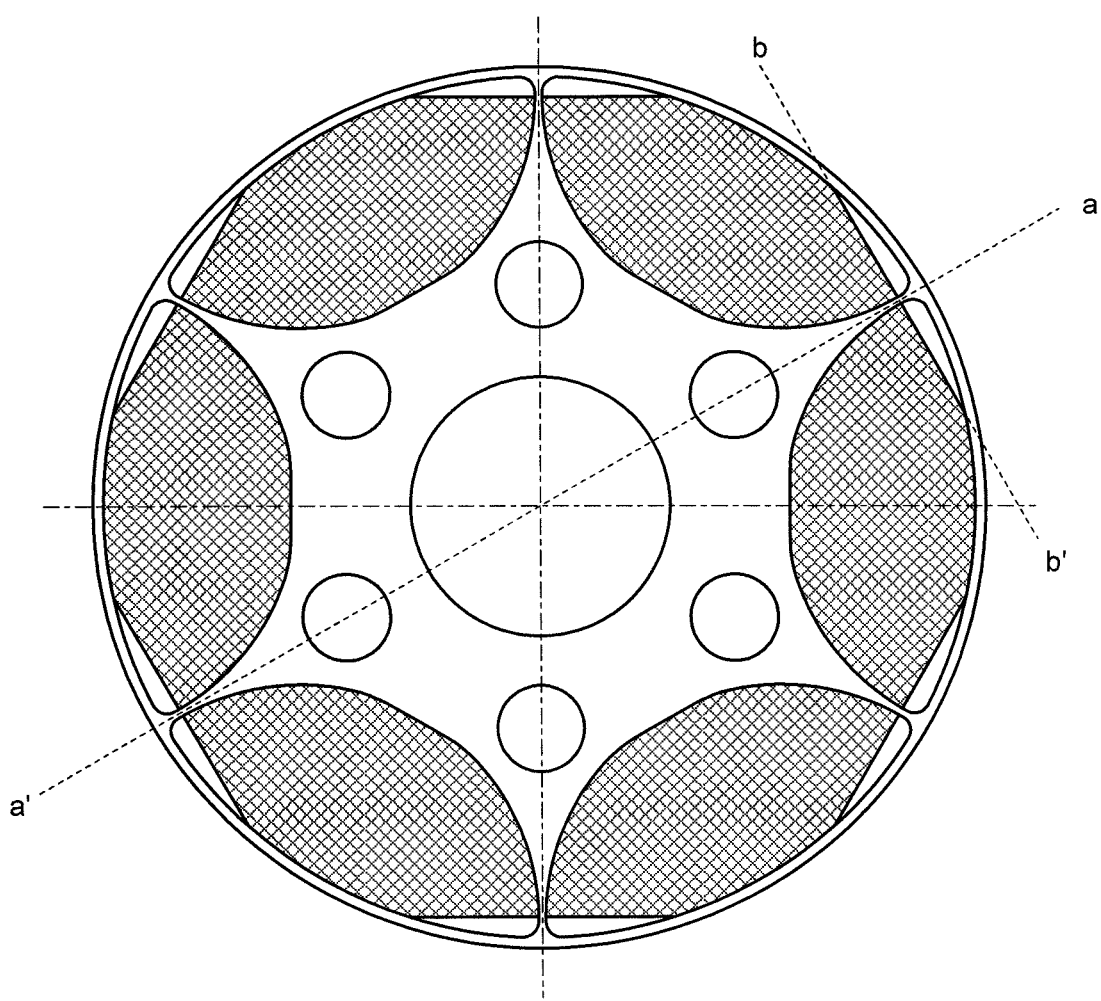
FIG. 12 depicts an example of magnets that are cut so that $\theta=90$ degrees.

FIG. 11 depicts a rotor that has been demagnetized by three percent (the same state as in the example of FIG. 5), and depicts how an angle θ is defined. The angle θ is formed by a center line between adjacent magnets a-a' and a line b-b' which indicates cut surfaces of the magnets. Demagnetization in the range of three percent occurs mainly on the surface of the rotor; specifically, an area defined by a line that is perpendicular to the center line between adjacent magnets a-a', that is, the line b-b' when θ=90 degrees, and the outer circumferential face of the rotor. This is because magnetic force greatly affects the outer circumferential faces of the magnets. Thus, in order to reduce the effects of demagnetization when the level of demagnetization is three percent, it would be desirable to cut the outer circumferential side with respect to the line b-b' where the line b-b' is perpendicular to the center line between adjacent magnets a-a'. On the other hand, when demagnetization is in the range of three percent, setting the line b-b' so that θ<90 degrees is established with respect to the center line between adjacent magnets a-a', and cutting in parallel to the line b-b' would result in the excessive cutting away of the inner circumferential side of the magnets where demagnetization within the range of three percent does not occur. It is therefore preferable to cut so that θ=90 degrees. FIG. 12 depicts an example of magnets that are cut so that θ=90 degrees.

Figure 13:
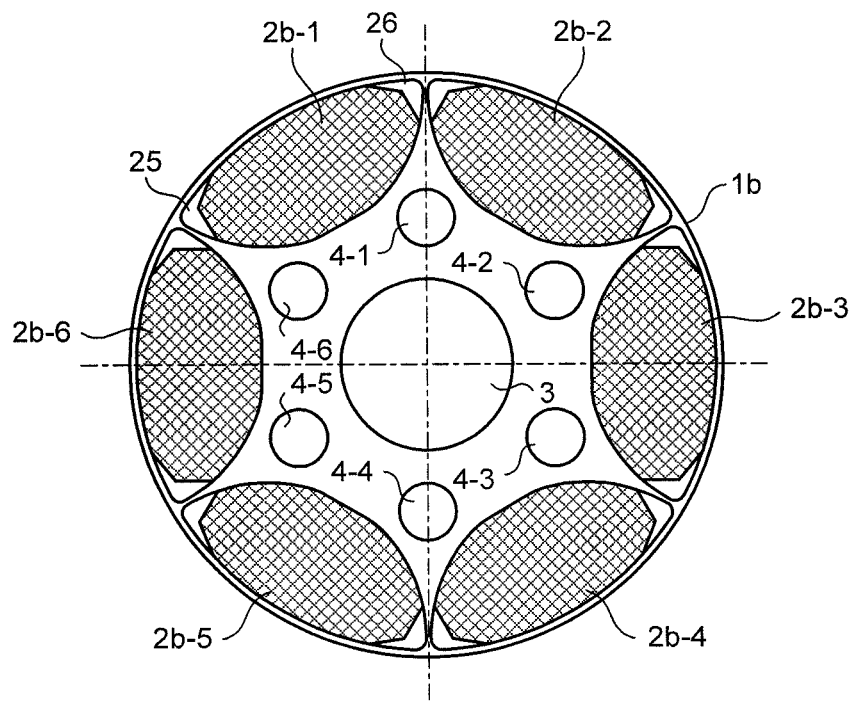
FIG. 13 depicts an example of a rotor in which ends in the circumferential direction of magnets are cut off.
Figure 14:
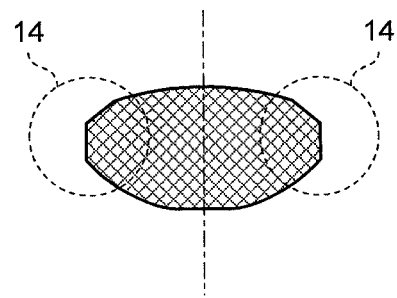
FIG. 14 depicts the shape of the magnet in the example of FIG. 13.

FIG. 13 depicts an example in which the ends in the circumferential direction of the magnets in FIG. 1 are further cut off. In the example of FIG. 13, magnet insertion pockets, which are the same as in the example of FIG. 1, are formed in a rotor core 1b. FIG. 14 depicts the shape of magnets 2b-1 to 2b-6 in the example of FIG. 13. As can be observed from cut-off portions 14 in FIG. 14, by providing openings (for example, openings 25 and 26) in which both ends in the circumferential direction of the rotor are further cut off, further improvement, in demagnetization proof stress compared to in the example of FIG. 1 can be expected.

Figure 15:
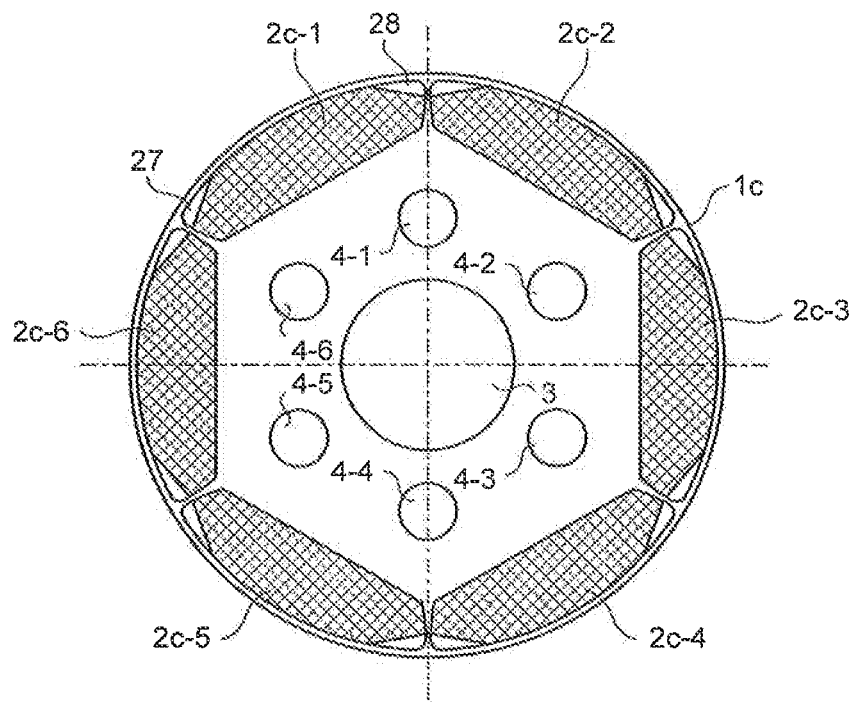
FIG. 15 depicts an example of openings in a rotor in which inner circumferential faces of magnets and magnet insertion pockets are shaped to be straight.
Figure 16:
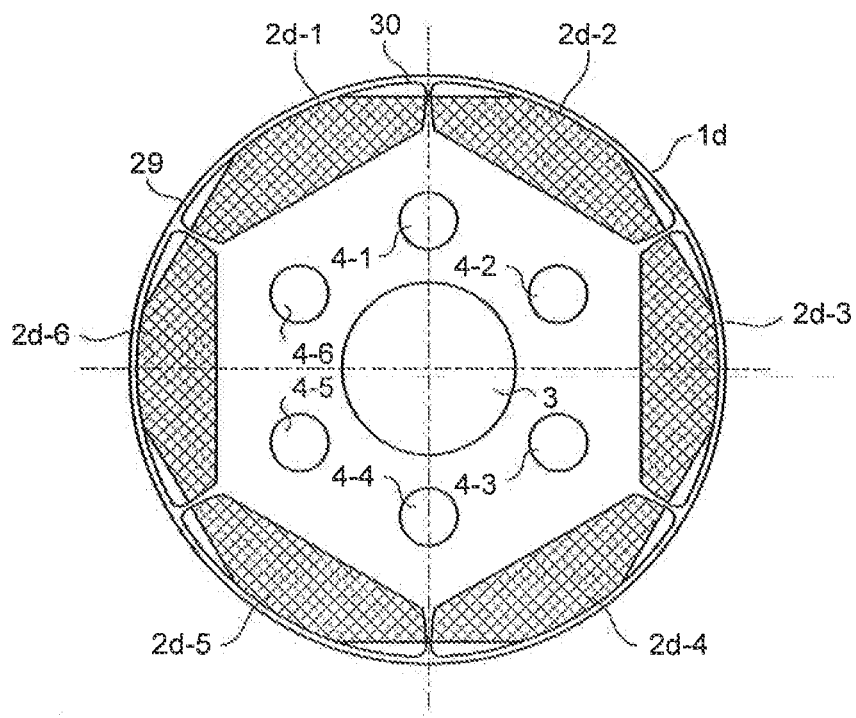
FIG. 16 depicts an example of openings in a rotor in which inner circumferential faces of magnets and magnet insertion pockets are shaped to be straight.
Figure 17:
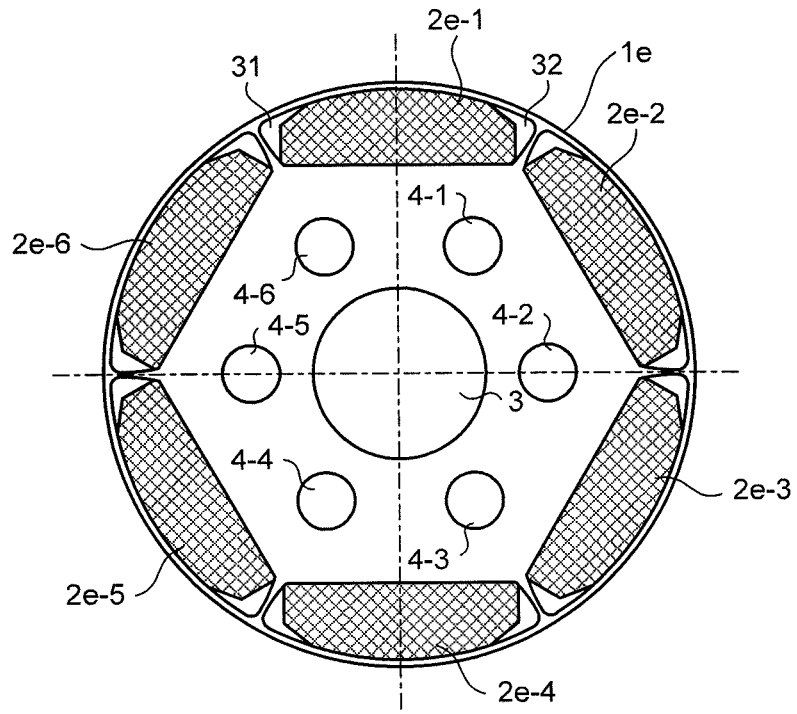
FIG. 17 depicts an example of openings in a rotor in which inner circumferential faces of magnets and magnet insertion pockets are shaped to be straight.

FIGS. 15 to 17 depict examples of rotors in which the inner circumferential faces of magnets and magnet insertion pockets to which the magnets are inserted, are shaped to be straight. In the examples of FIGS. 15 to 17, the magnet insertion pockets in which the outer circumferential sides are arcs that project toward the outer circumference, and in which the inner circumferential sides are shaped to be straight, are each provided in rotor cores 1c, 1d, and 1e. In the example of FIG. 15, openings (for example, openings 27 and 28) are provided by cutting off, by a straight cut, the ends on the outer circumferential side of magnets 2c-1 to 2c-6 in the same manner as in the example of FIG. 1. In the example of FIG. 16, openings (for example, openings 29 and 30) are provided by incorporating magnets 2d-1 to 2d-6 that are cut so that θ=90 degrees in the same manner as in FIG. 11. In the example of FIG. 17, openings (for example, openings 31 and 32) are provided by further cutting off the ends in the circumferential direction, in addition to the ends on the outer circumferential side of magnets 2e-1 to 2e-6 in the same manner as in FIG. 13. In the examples of FIG. 15 to FIG. 17, since the magnets before the magnets are cut off, and the magnet insertion pockets to which the magnets are inserted, are arcs that project toward the outer circumference, and have straight inner circumferential sides, improvement in productivity can be achieved.

Figure 18:
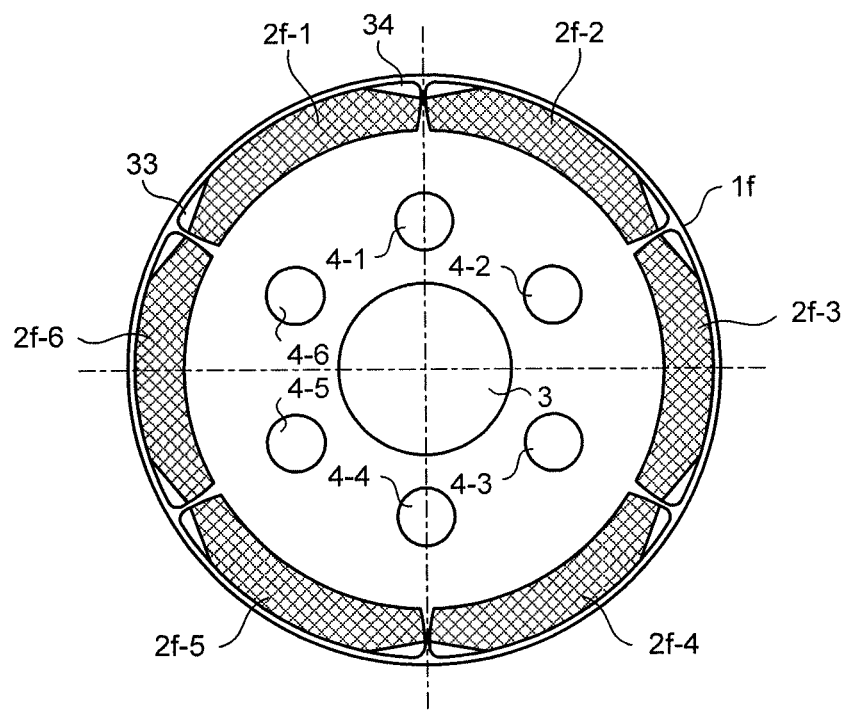
FIG. 18 depicts an example of openings in a rotor in which magnets and magnet insertion pockets are shaped as arcs that project toward the outer circumference and that have a uniform thickness.
Figure 19:
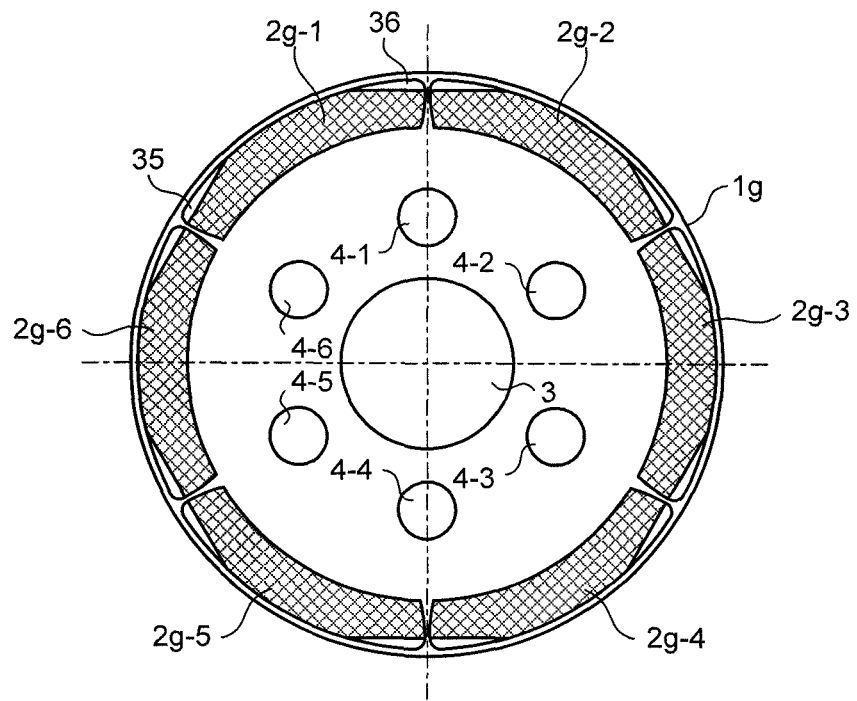
FIG. 19 depicts an example of openings in a rotor in which magnets and magnet insertion pockets are shaped as arcs that project toward the outer circumference and that have a uniform thickness.
Figure 20:
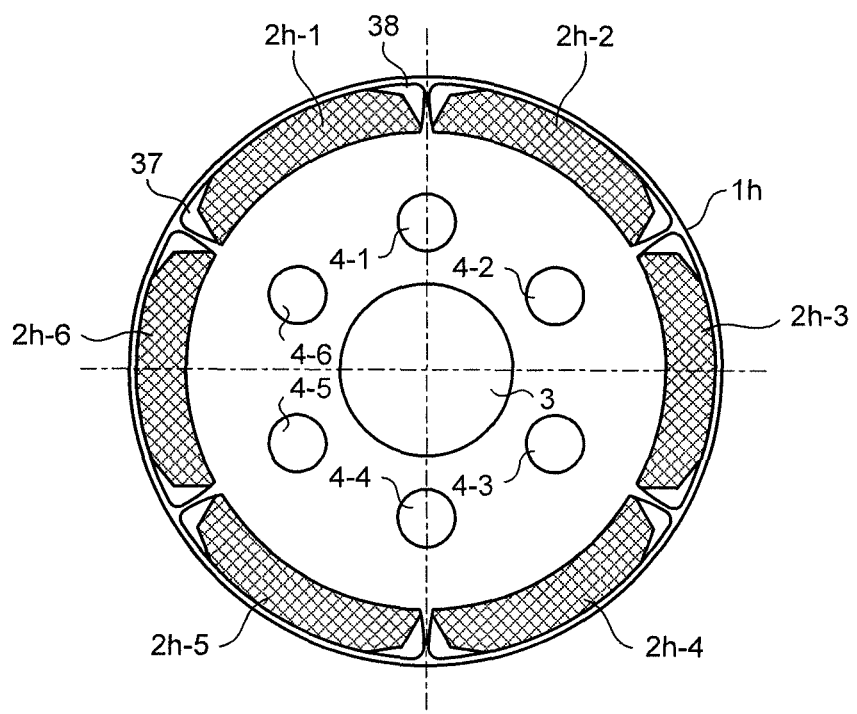
FIG. 20 depicts an example of openings in a rotor in which magnets and magnet insertion pockets are shaped as arcs that project toward the outer circumference and that have a uniform thickness.

FIG. 18 to FIG. 20 are examples in which the magnets and the magnet insertion Dockets to which the magnets are inserted, are shaped as arcs that project toward the outer circumference and that have a uniform thickness. In the examples of FIGS. 18 to 20, magnet insertion pockets which are shaped as arcs that project toward the outer circumference and that have a uniform thickness, are each provided in rotor cores 1f, 1g, and 1h. Likewise in this case, improvement in the demagnetization proof stress can be achieved by providing openings at the ends on the outer circumferential side. In the examples of FIG. 18 to FIG. 20, since the thickness is uniform, high productivity is yielded.

FIG. 18 depicts an example in which openings (for example, openings 33 and 34) are provided by cutting off, by a straight cut, the ends on the outer circumferential side of magnets 2f-1 to 2f-6 in the same manner as in the example of FIG. 1. In the example of FIG. 19, openings (for example, openings 35 and 36) are provided by incorporating magnets 2g-1 to 2g-6 that are cut so that θ=90 degrees in the same manner as in FIG. 11. In the example of FIG. 20, openings (for example, openings 37 and 38) are provided by further cutting off the ends in the circumferential direction, in addition to the ends on the outer circumferential side of magnets 2h-1 to 2h-6 in the same manner as in FIG. 13.

Figure 21:
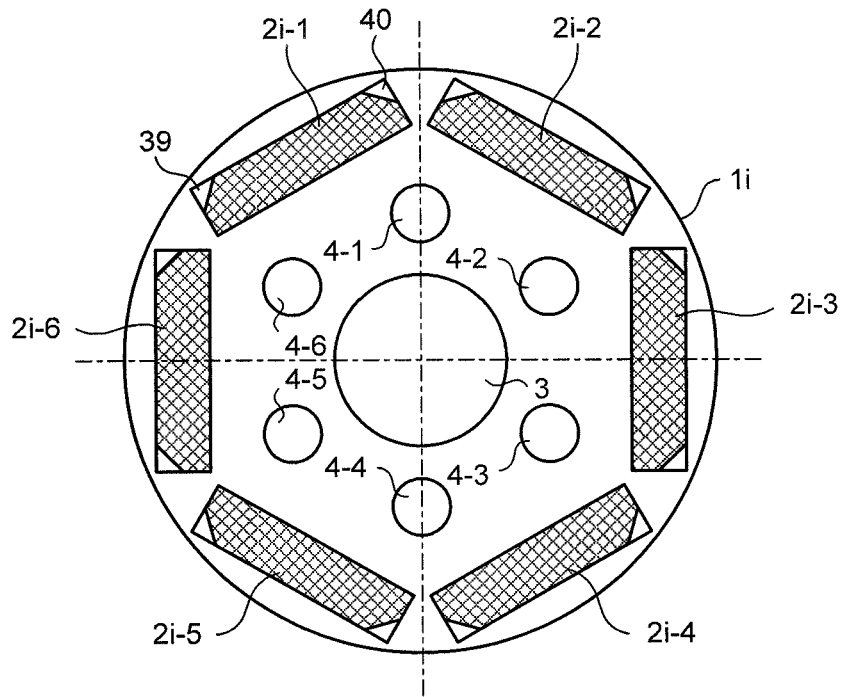
FIG. 21 depicts an example of openings in a rotor in which magnets and magnet insertion pockets are shaped as flat plates.
Figure 22:
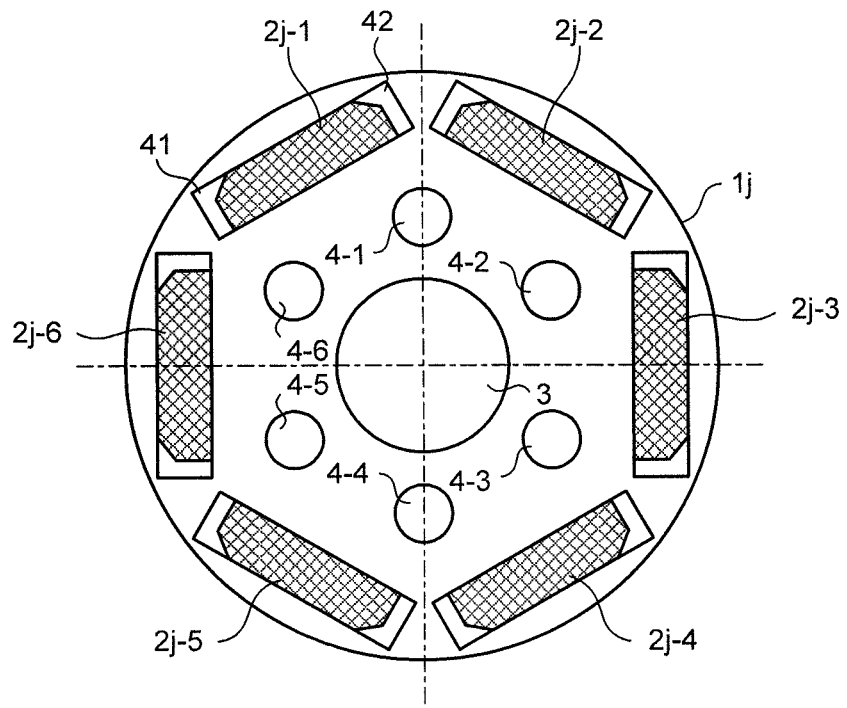
FIG. 22 depicts an example of openings in a rotor in which magnets and magnet insertion pockets are shaped as flat plates.
Figure 23:
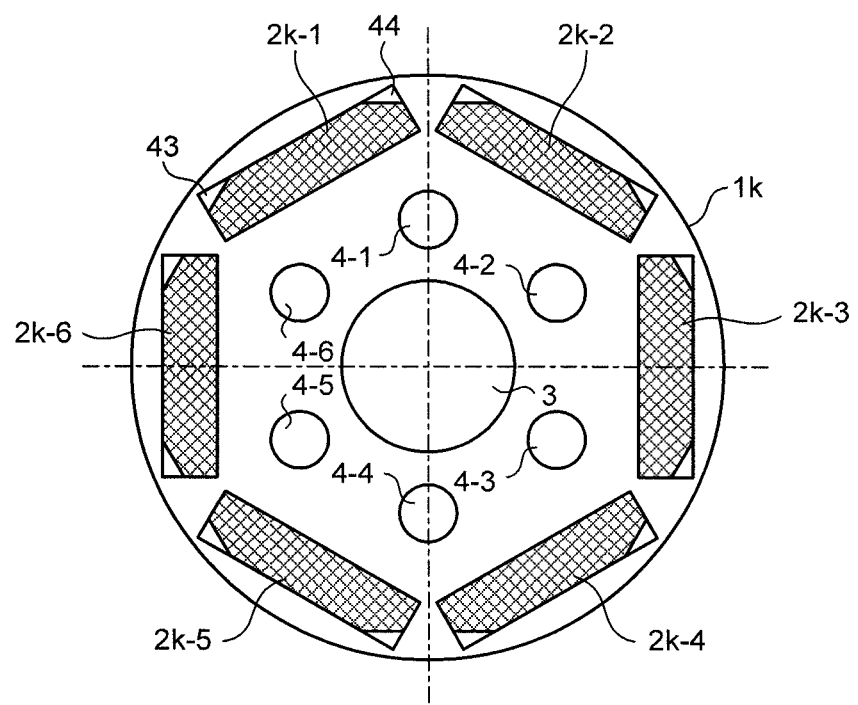
FIG. 23 depicts an example of openings in a rotor in which magnets and magnet insertion pockets are shaped as flat plates.

FIG. 21 to FIG. 23 depict examples in which magnets and magnet insertion pockets to which the magnets are inserted, are shaped as flat plates. In the examples of FIG. 21 and FIG. 22, magnet insertion pockets that are shaped as flat plates, are each provided in rotor cores 1i, 1l, and 1k. Likewise in this case, improvement in the demagnetization proof stress can be achieved by providing openings at the ends on the outer circumferential side. In addition, the flat-plate shape allows for high productivity.

In FIG. 21, openings (for example, openings 39 and 40) are provided by cutting off, by a straight cut, the ends on the outer circumferential side of magnets 2i-1 to 2i-6. In the example of FIG. 22, openings (for example, openings 41 and 42) are provided by further cutting off the ends in the circumferential direction, in addition to the ends on the outer circumferential side of magnets 2j-1 to 2j-6 in the same manner as in FIG. 13. In the example of FIG. 23, openings (for example, openings 43 and 44) are provided by incorporating magnets 2k-1 to 2k-6 that are cut so that θ=90 degrees in the same manner as in FIG. 11.

Thus, in the present embodiment, openings are provided at the ends on the outer circumferential side by cutting off the ends on the outer circumferential side of the magnets, which have a higher susceptibility to demagnetization. Hence, a decline in magnetic force that is caused by cutting off portions other than portions that have a higher susceptibility to demagnetization can be prevented, while resistance to demagnetization is obtained.

INDUSTRIAL APPLICABILITY

As described above, the rotor and the interior permanent magnet motor according to the present invention are useful as rotors and interior permanent magnet motors.

The invention claimed is:

1. A rotor constituting an interior permanent magnet motor, the rotor comprising:
a permanent magnet generating a magnetic field; and
a rotor core including a magnet insertion pocket to which the permanent magnet is inserted,
wherein, when the permanent magnet is inserted, the magnet insertion pocket is formed so as to provide a first space on a side of a first end out of both ends of the permanent magnet in a circumferential direction and a second space on a side of a second end out of the both ends of the permanent magnet in the circumferential direction of the permanent magnet, and
wherein the first space is formed on an outer circumferential side of the rotor core, between the rotor core and a first face of the permanent magnet, the second space is formed, on the outer circumferential side of the rotor core, between the rotor core and a second face of the permanent magnet, the first face of the permanent magnet and the second face of the permanent magnet being perpendicular to a line that connects a center between adjacent permanent magnets and a center of the rotor core, and
the first space of the permanent magnet includes the first face and the second space of another permanent magnet which is adjacent, in the circumferential direction, to the permanent magnet, includes the second face, the first face of the permanent magnet and the second face of the another permanent magnet being perpendicular to a same line.

2. The rotor according to claim 1, wherein the magnet insertion pocket is formed so that an outer circumferential face is shaped as an arc that projects toward an outer circumference.

3. The rotor according to claim 1, wherein an inner circumferential face of the magnet insertion pocket is formed to be planar.

4. The rotor according to claim 3, wherein
Inside each of the first space and the second space, the permanent magnet is spaced apart from the arc shape of the magnet insertion pocket and does not come in contact with the arc shape of the magnet insertion pocket.

5. The rotor according to claim 1, wherein the magnet insertion pocket is formed so that a radial thickness is uniform.

6. The rotor according to any one of claim 1, wherein an inner circumferential face of the magnet insertion pocket is formed to have a shape that projects toward the center of the rotor.

7. An interior permanent magnet motor comprising:
a rotor according to claim 1; and
a stator disposed radially outward from the rotor.

8. A rotor constituting an interior permanent magnet motor, the rotor comprising:
a permanent magnet including a first end and a second end on respective ends in a circumferential direction and generating a magnetic field; and
a rotor core including a magnet insertion pocket to which the permanent magnet is inserted,
wherein, the magnet insertion pocket is formed so as to provide first space on a side of the first end and second space on a side of the second end when the permanent magnet is inserted, and outer circumferential faces of the magnet insertion pocket and the permanent magnet are an arc in shape that projects toward an outer circumference of the rotor core,
the first space is surrounded by a first face of the permanent magnet that is parallel to a rotating shaft of the rotor, a second face of the permanent magnet that is parallel to the rotating shaft of the rotor and is different from and not parallel to the first face, and the arc shape of the magnet insertion pocket,
the second space is surrounded by a third face of the permanent magnet that is parallel to a rotating shaft of the rotor, a fourth face of the permanent magnet that is parallel to the rotating shaft of the rotor and is different from and not parallel to the third face, and the arc shape of the magnet insertion pocket,
the first face and the third face are provided on a side of the outer circumference of the rotor core,
the second face and the fourth face are parallel to each other, and
the second space is symmetrical in shape to the first space with respect to a line that connects a center of the magnet insertion pocket and a center of the rotor core in a cross section of the rotor core.

9. An interior permanent magnet motor comprising:
a rotor according to claim 8; and
a stator disposed radially outward from the rotor.

* * * * *